United States Patent
Sato et al.

(10) Patent No.: US 7,868,253 B2
(45) Date of Patent: Jan. 11, 2011

(54) WIRE COVERING MATERIAL COMPOSITION, AN INSULATED WIRE AND A WIRING HARNESS

(75) Inventors: Masashi Sato, Yokkaichi (JP); Masato Inoue, Yokkaichi (JP); Naoaki Sawamura, Yokkaichi (JP); Yoshiharu Deguchi, Yokkaichi (JP); Yukihiro Sakamoto, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

(*) Notice: Subject to any disclaimer, the term of this patent is extended or adjusted under 35 U.S.C. 154(b) by 176 days.

(21) Appl. No.: 12/310,651

(22) PCT Filed: Aug. 22, 2007

(86) PCT No.: PCT/JP2007/066282
§ 371 (c)(1),
(2), (4) Date: Mar. 3, 2009

(87) PCT Pub. No.: WO2008/032536
PCT Pub. Date: Mar. 20, 2008

(65) Prior Publication Data
US 2010/0065301 A1  Mar. 18, 2010

(30) Foreign Application Priority Data
Sep. 11, 2006  (JP) .............................. 2006-245129

(51) Int. Cl.
H01B 7/00  (2006.01)

(52) U.S. Cl. ............................. 174/110 R; 174/110 SR
(58) Field of Classification Search ............. 174/110 R, 174/110 SR, 110 FC, 36; 526/336; 528/301, 528/272, 274
See application file for complete search history.

(56) References Cited

U.S. PATENT DOCUMENTS

| 6,833,428 B1* | 12/2004 | Kato ........................... 528/301 |
| 6,838,538 B2* | 1/2005 | Toyoizumi et al. .......... 526/336 |
| 2005/0187355 A1* | 8/2005 | Tasaka et al. ................ 525/314 |

FOREIGN PATENT DOCUMENTS

| JP | A-7-176219 | 7/1995 |
| JP | A-2003-105179 | 4/2003 |
| JP | A-2006-225492 | 8/2006 |

\* cited by examiner

*Primary Examiner*—William H Mayo, III
(74) *Attorney, Agent, or Firm*—Oliff & Berridge, PLC

(57) ABSTRACT

A wire covering material composition which is systematically different from a polyolefin resin composition and which possesses favorable flame retardancy, tensile elongation and wear resistance, having 100 parts by weight of a polymer blend containing 40-95 wt % of polybutylene terephthalate, and 1 to 30 parts by weight of a phosphoric ester compound with respect to 100 parts by weight of the polymer blend, wherein 5 to 100 wt % of the total content of the polybutylene terephthalate in the polymer blend is made up of polybutylene terephthalate, whose molecular weight distribution Mw/Mn (where Mw: weight-average molecular weight; Mn: number-average molecular weight) is greater than or equal to 2.5.

5 Claims, No Drawings

WIRE COVERING MATERIAL COMPOSITION, AN INSULATED WIRE AND A WIRING HARNESS

TECHNICAL FIELD

The present invention relates to a wire covering material composition, an insulated wire and a wiring harness.

BACKGROUND ART

Conventionally, for an insulated covering material for an insulated wire used in carrying out wiring of parts for an automobile and electric/electronic equipment and other parts, there is widespread use of a vinyl chloride resin composition to which a halogenous flame retardant is added.

However, there is a problem that the insulated covering material includes halogen elements, so that it emits harmful halogenous gas into the atmosphere incase of car fire or at the time of combustion for disposing of electric/electronic equipment by incineration, causing environmental pollution.

Therefore, from the viewpoint of reducing loads on the global environment, the insulated covering material has recently changed from the vinyl chloride resin composition to a polyolefin resin composition, which is prepared by adding a metallic hydrate such as magnesium hydroxide to polyolefin such as polyethylene.

As the insulated wire using the polyolefin resin composition for the insulated covering material, Japanese Patent Application Unexamined Publication No. H7-176219, for example, discloses an insulated wire using a composition which includes 30 to 100 parts by weight of magnesium hydroxide with respect to 100 parts by weight of a polymer blend of straight-chain polyethylene and carboxylic modified polyethylene.

DISCLOSURE OF THE INVENTION

Problems to be Solved by the Invention

Essential properties required for this kind of insulated wire are flame retardancy, tensile elongation and wear resistance.

However, a polyolefin resin composition usually requires a large amount of flame retardant (such as magnesium hydroxide) to be added thereto in order to secure sufficient flame retardancy, thus bringing a disadvantage that tensile elongation and wear resistance are liable to be remarkably degraded. Especially, this disadvantage tends to be experienced in a thin-walled insulated wire having a thin insulated covering material.

As described above, the situation has been such that the wire covering material composition which is favorable in any of flame retardancy, tensile elongation and wear resistance is not easily arranged by a mere improvement of the polyolefin resin composition.

The present invention has been made in view of the circumstance described above. Objects of the present invention is to overcome the problems described above and to provide a wire covering material composition which is systematically different from the polyolefin resin composition and which possesses favorable flame retardancy, tensile elongation and wear resistance, and also provide an insulated wire and a wiring harness using the same.

Means to Solve the Problem

To achieve the objects and in accordance with the purpose of the present invention, a wire covering material composition has 100 parts by weight of a polymer blend containing 40-95 wt % of polybutylene terephthalate, and 1 to 30 parts by weight of a phosphoric ester compound with respect to 100 parts by weight of the polymer blend, wherein 5 to 100 wt % of the total content of the polybutylene terephthalate in the polymer blend is made up of polybutylene terephthalate, whose molecular weight distribution Mw/Mn (where Mw: weight-average molecular weight; Mn: number-average molecular weight) is greater than or equal to 2.5.

Further, an insulated wire according to the present invention has a covering layer composed of the wire covering material composition.

It is preferable that the covering layer is smaller than or equal to 0.4 mm in thickness.

Further, a wiring harness according to the present invention includes the insulated wire.

EFFECTS OF THE INVENTION

A wire covering material composition has 100 parts by weight of a polymer blend containing 40-95 wt % of polybutylene terephthalate, and 1 to 30 parts by weight of a phosphoric ester compound with respect to 100 parts by weight of the polymer blend, wherein 5 to 100 wt % of the total content of the polybutylene terephthalate in the polymer blend is made up of polybutylene terephthalate, whose molecular weight distribution Mw/Mn (where Mw: weight-average molecular weight; Mn: number-average molecular weight) is greater than or equal to 2.5.

For the reason, the wire covering material composition is favorable in any one of flame retardancy, tensile elongation and wear resistance. This is inferred from the following reasons. That is, because the polybutylene terephthalate is a representative engineering plastic having high quality crystal growth and showing great strength and high hardness. Therefore, for example, the polybutylene terephthalate is favorably used as a material of a connector which requires structural strength or other properties, while not usually applied for the wire covering material.

However, in the present invention, because the wire covering material composition includes the specific content of the polybutylene terephthalate which has a relatively broad molecular weight distribution, there is inferred that a crystallization rate of the polybutylene terephthalate becomes relatively slow and amorphous polybutylene terephthalate is produced, thereby allowing to show favorable tensile elongation as the wire covering material. In addition, because the wire covering material composition includes the specific content of the phosphoric ester compound, there is inferred that frame retardancy can be imparted without degrading tensile elongation and wear resistance.

Since the insulated wire according to the present invention uses the wire covering material composition as an insulated covering material, excellent flame retardancy, tensile elongation and wear resistance are displayed.

Especially, scratch resistance is displayed since the insulated wire possesses excellent wear resistance even when a covering layer of the insulated wire is thin with a thickness of smaller than or equal to 0.4 mm.

A wiring harness according to the present invention includes the insulated wire, so that advantageous properties such as scratch resistance are displayed even when the covering layer of the insulated wire is scratched by a terminal or other elements in routing the insulated wire during production of the harness. In addition, an advantageous effect such as high reliability can be ensured over a long period of time when using the harness since the insulated wire possesses wear resistance. Further, an advantageous effect such as a readiness to reduce a diameter of the wiring harness can be achieved since a thickness of the covering layer of the insulated wire is easily reduced.

BEST MODE FOR CARRYING OUT THE INVENTION

A detailed description of one preferred embodiment of the present invention will now be provided. Hereinafter, in the description, a wire covering material composition according to the preferred embodiment of the present invention is sometimes referred to as "present composition," an insulated wire according to the preferred embodiment of the present invention is sometimes referred to as "present wire," and a wiring harness according to the preferred embodiment of the present invention is sometimes referred to as "present wiring harness."

1. Wire Covering Material Composition

The present composition includes 1 to 30 parts by weight of a phosphoric ester compound with respect to 100 parts by weight of a polymer blend containing polybutylene terephthalate.

1.1 Polymer Blend

In the present composition, the polymer blend contains 40-95 wt % of the polybutylene terephthalate. This is because in a case where a content of the polybutylene terephthalate in the polymer blend becomes smaller than 40 wt %, a tendency to degrade wear resistance is shown, and in a case where the content of the polybutylene terephthalate in the polymer blend becomes greater than 95 wt %, a tendency to degrade flame retardancy is shown.

From the view point of developing excellent frame retardancy, the upper limit of the content of the polybutylene terephthalate in the polymer blend is preferably smaller than or equal to 90 wt %, and more preferably smaller than or equal to 85 wt %. Meanwhile, from the view point of developing excellent wear resistance, the lower limit of the content of the polybutylene terephthalate in the polymer blend is preferably greater than or equal to 45 wt %, and more preferably greater than or equal to 50 wt %.

Besides, in the present composition, 5 to 100 wt % of the total content of the polybutylene terephthalate in the polymer blend is made up of polybutylene terephthalate, whose molecular weight distribution Mw/Mn (where Mw: weight-average molecular weight; Mn: number-average molecular weight, hereinafter abbreviated) is greater than or equal to 2.5.

In the present composition, a value of the molecular weight distribution Mw/Mn of the polybutylene terephthalate is measured as described below.

To be more specific, the polybutylene terephthalate which is the object to be measured is subject to be dissolved in a mixed solution of hexafluoroisopropanol (HFIP) and chloroform, and a mixed solution of HFIP and $CF_3COONa$ is used as eluant, whereby the molecular weight distribution Mw/Mn of the polybutylene terephthalate is measured by an ultraviolet detector using a GPC (gel permeation chromatography) apparatus.

In a case where the content of the polybutylene terephthalate, whose molecular weight distribution Mw/Mn is greater than or equal to 2.5, becomes smaller than wt %, a tendency to degrade tensile elongation, especially tensile elongation after a thermal aging, is shown.

From the view point of developing excellent tensile elongation, the lower limit of the content of the polybutylene terephthalate, whose molecular weight distribution Mw/Mn is greater than or equal to 2.5, is preferably greater than or equal to 10 wt %, and more preferably greater than or equal to 15 wt %, and the most preferably greater than or equal to 20 wt %.

It is added that, in the present composition, the upper limit of the molecular weight distribution Mw/Mn is not limited in particular; however, the polybutylene terephthalate showing an excessively broad molecular weight distribution is not easily produced and obtained. From the view point, the upper limit of the molecular weight distribution Mw/Mn is preferably smaller than or equal to 5, and more preferably smaller than or equal to 4.5.

The present composition may contain the polybutylene terephthalate, whose molecular weight distribution Mw/Mn is smaller than 2.5, if the content of the polybutyl ene terephthalate, whose molecular weight distribution Mw/Mn is greater than or equal to 2.5, is within the above-specified range.

Components other than the polybutylene terephthalate in the polymer blend (hereinafter, sometimes referred to as "other polymer components") are not limited in particular; however, the following polymers, for example, are preferably used. They may be contained by one sort alone, or more than one sort in combination.

For the other polymer components, an olefin copolymer such as polyethylene telephthalate, polyethylene naphthalate, polybutylene naphthalate, a polycarbonate resin, a polyphenylene ether resin, a polyamide resin, polyacetal, polyphenylene sulfide, polyethylene (high-density polyethylene (HDPE), middle-density polyethylene (MDPE), low-density polyethylene (LDPE), linear low-density polyethylene (LLDPE), very low-density polyethylene (VLDPE)), polypropylene (homo, random, block), polybutene, an alpha-olefin copolymer (ethylene-vinyl acetate copolymer (EVA)), an ethylene-methylacrylate copolymer (EMA), an ethylene-ethylacrylate copolymer (EEA), an ethylene-butylacrylate copolymer (EBA), and an ethylene-methyl methacrylate copolymer (EMMA); a thermoplastic elastomer such as a thermoplastic polyester elastomer, a thermoplastic polyurethane elastomer, a thermoplastic polyamide elastomer; a styrene polymer such as a styrene resin including polystyrene (PS), high impact polystyrene (HIPS), an acrylonitrile-styrene copolymer (AS), an acrylonitrile-butadiene-styrene copolymer (ABS), and a methyl methacrylate-butadiene-styrene copolymer, and a thermoplastic styrene elastomer including a stylene-ethylene/butyrene stylene block copolymer (SEBS), a styrene-ethylene/propylene-stylene block copolymer (SEPS) and hydrogenerated products thereof; a graft copolymer having a main chain of the olefin copolymer and a side chain of the styrene copolymer which is grafted; and a graft copolymer having a main chain of the polycarbonate resin and a side chain of the styrene copolymer which is grafted are preferably used.

Into the other polymer component, a functional group such as a carboxylic acid group, an acid anhydrous group, an epoxy group, a silane group and an oxazolin group may be introduced by a graft polymerization, a direct polymerization or other polymerization method. They may be contained by one sort alone, or more than one sort in combination.

For a compound for introducing the carboxylic acid group or the acid anhydrous group, an alpha, beta-unsaturated dicarboxylic acid such as a maleic acid, a fumaric acid, a citraconic acid and an itaconic acid, anhydrides thereof, and an unsaturated monocarboxylic acid such as an acrylic acid, a methacrylic acid, a furan acid, a crotonic acid, a vinylacetic acid and a pentane acid are preferably used. They may be contained by one sort alone, or more than one sort in combination. Among them, the maleic acid and the maleic anhydride are preferably used.

For a compound for introducing the epoxy group, glycidyl acrylate, glycidyl methacrylate, an itaconic monoglycidyl ester, a butene tricarboxylic acid monoglycidyl ester, a butene tricarboxylic acid diglycidyl ester and a butene tricarboxylic acid triglycidyl ester; glycidyl esters including an alpha-chloroacrylic acid, a maleic acid, a crotonic acid and a fumaric acid; glycidyl ethers including a vinyl glycidyl ether, an allyl glycidyl ether, a glycidyl oxyethyl vinyl ether and a styrene-p-glycidyl ether, and p-glycidyl styrene are preferably used. They may be contained by one sort alone, or more than one sort in combination.

For a compound for introducing the silane group, an unsaturated silan compound such as vinyltrimethoxysilane, vinyltriethoxysilane, vinyltriacetylsilane, and vinyltrichlorosilane are preferably used. They may be contained by one sort alone, or more than one sort in combination.

1.2 Phosphoric Ester Compound

The present composition includes 1 to 30 parts by weight of the phosphoric ester compound with respect to 100 parts by weight of the polymer blend as described above.

For the phosphoric ester compound, an aromatic phosphoric ester such as trimethyl phosphate, triethyl phosphate, triphenyl phosphate, tricresyl phosphate, trixylenyl phosphate, cresyl diphenyl phosphate, cresyl 2,6-xylenyl phosphate, each of which is halogen-free; and an aromatic condensed phosphoric ester such as 1,3-phenylene bis(diphenyl phosphate), bisphenol A bis (diphenyl phosphate), 1,3-phenylene bis(di-2,6-xylenyl phosphate) and 1,4-phenylene bis (di-2,6-xylenyl phosphate), each of which is halogen-free, are preferably used. They may be contained by one sort alone, or more than one sort in combination.

If the amount of the phosphoric ester compound becomes greater than 30 parts by weight, a tendency to degrade wear resistance is shown. Meanwhile, if the amount of the phosphoric ester compound in the polymer blend is smaller than 1 part by weight, a tendency to degrade flame retardancy is shown.

From the viewpoint of developing excellent wear resistance, the upper limit of the amount of the phosphoric ester compound is preferably smaller than or equal to 25 parts by weight, and more preferably smaller than or equal to 20 parts by weight. Meanwhile, from the view point of developing excellent flame retardancy, the lower limit of the amount of the phosphoric ester compound is preferably greater than or equal to 2 parts by weight weight, and more preferably greater than or equal to 3 parts by weight.

1.3 Optional Component

The present composition may appropriately contain optional components described below when necessary.

As the optional components, an anti oxidant (such as a phenolic antioxidant, a sulfurous antioxidant, and a phosphorus antioxidant), a light stabilizer, a metal deactivator (such as a copper inhibitor), a lubricant (such as fatty acid base, fatty amide base, metal soap base, hydrocarbon base (wax type), ester base and silicon base), a nucleating agent, an antistatic agent, a coloring agent, a flame-retardant auxiliary agent (such as silicon base, nitrogen base and zinc borate), a coupling agent (such as silane base and titanate base), a softener (such as a processed oil), a zinc compound (such as zinc oxide and zinc sulfide), a reinforcing agent (such as glass fiber, wallastonite, talc, bentonite and montmorillonite), and a filler (such as calcium carbonate), which are each an agent usually used as an additive for plastics and rubbers, maybe preferably used. One or more than one sort of these components may be blended as appropriate if they are added within the ranges of not departing from the gist of the present invention.

1.4 Production Process of Present Composition

The production process of the present composition is not limited in particular. For example, the present composition may be prepared by kneading all of the components at once with the use of a kneader such as a twin-screw extruder, or by feeding a part of the components from a feeder during kneading. In addition, the present composition may be prepared by firstly kneading a part of the components and subsequently adding the rest of the components so as to knead in two stages.

2. Insulated Wire

The present wire has a covering layer (hereinafter, sometimes referred to as "a specific covering layer") composed of the present composition described above as an insulated covering material.

2.1 Layer Constitution of Insulated Covering Material

In the present wire, the covering layer may be formed of one layer or may be formed of two or more layers. If there is one layer forming the covering layer, the one layer defines the specific covering layer. If there are a plurality of layers forming a covering layer, any one of the plurality of layers may define the specific covering layer. The covering layer is preferably formed of one layer in view of a readiness to reduce a thickness of the covering layer.

For a layer constitution of the present wire, for example, a constitution in which a surface of a conductor is directly covered with one specific covering layer, or a constitution in which the surface of the conductor is covered with at least one or more covering layers (such as the specific covering layer, another covering layer, and a combination thereof) and a surface of the covering layer is covered with the specific covering layer are preferably used.

The specific covering layer preferably defines an outermost layer. This is because an advantageous effect of the specific covering layer is easily shown when the specific covering layer defines the outermost layer which is the most susceptible to an external environment such as fire (or heat) or slide.

From the view point of developing preferable properties such as flexibility and handling property, an upper limit value of a thickness of the specific covering layer is preferably selected from any one of 0.4, 0.35, 0.3, 0.25, 0.2 mm, for example. Meanwhile, a lower limit value used in combination of one of these upper limit values is preferably selected from any one of 0.06 mm, 0.08 mm, 0.1 mm, for example.

2.2 Conductor

For the conductor, a single wire, a twisted wire in the form of a plurality of individual wires being twisted, and a twisted wire on which compression is applied are preferably used. In addition, metals (including a metal alloy) such as copper, a copper base alloy, aluminum, an aluminum base alloy and stainless, for example, are preferably used as materials of the conductor. It is added that when the conductor is composed of the twisted wire, the material of each twisted wire may be entirely the same, or may be a combination of two or more materials different from each other. The diameter of the conductor is not limited in particular and may be chosen appropriately depending on an application.

2.3 Production Process of Present Wire

For the production process of the present wire, the following production methods are preferably used. For example, when the present wire has a constitution in which the surface of the conductor is directly covered with the one specific covering layer, the present wire having the specific covering layer can be produced by covering the surface of the conductor with the present composition in an arbitrary thickness using an extrusion molding machine.

It is added that when the covering layer is formed of a plurality of layers, each layer can be formed by using an extrusion technique in which the material of each covering layer is extruded in the same manner as described above so as to allow the plurality of layers to be placed in a desired order.

3. Wiring Harness

The present wiring harness has the present wire. More specifically, the present wiring harness is prepared by covering a wire bundle including at least the present wire with a wiring-harness protective material.

The wiring-harness protective material is used for covering a surface of the wire bundle and protecting the wire bundle from an external environment.

For a base material from which the wiring-harness protective material is made, a non-halogenous resin composition and a vinyl chloride resin composition are preferably used.

For the non-halogenous resin composition, polyolefin flame-retardant resin compositions which are prepared by adding a non-halogenous flame retardant such as a metallic hydrate (such as magnesium hydroxide) or various additives to polyolefins such as polyethylene, polypropylene and a propylene-ethylene copolymer are preferably used.

The wiring-harness protective material is formed so as to have its base material tape-shaped and at least one side of the base material applied with an adhesive, or so as to have its base material tube-shaped or sheet-shaped. The shape can be selected appropriately as usage.

EXAMPLE

A description of the present invention will now be provided specifically with reference to Examples; however, the present invention is not limited hereto.

Test Material

Test materials used in the present Examples are all given as follows:

Polybutylene terephthalate <1> (PBT<1>) [Mw/Mn=2.2, manuf.: Mitsubishi Engineering-Plastics Corporation., trade name: "NOVADURAN5020"]

Polybutylene terephthalate <2> (PBT<2>) [Mw/Mn=2.2, manuf.: WinTech Polymer Ltd., trade name: "DURANEX2002"]

Polybutylene terephthalate <3> (PBT<3>) [Mw/Mn=2.6, manuf.: CHANG CHUN PLASTICS CO., LTD., trade name: "1100-211X"]

Polybutylene terephthalate <4> (PBT<4>) [Mw/Mn=2.5, manuf.: WinTech Polymer Ltd., trade name: "DURANEX800FP"]

It is added that each value of the molecular weight distribution Mw/Mn described above is obtained by measuring each polybutylene terephthalate by the GPC described above.

Measurement conditions are given as follows:
Manuf.: Tosoh Corporation., trade name: "HLC-802A"
Column: Shodex HFIP-LG+HFIP-806 M×2 columns
Eluant: HFIP+10 mM $CF_3COONa$
Temperature: Column constant temperature oven for column at 40° C.
Flow rate: 0.8 ml/min
Flow pressure: 31 $kgf/cm^2$
Concentration: approx. 0.1 wt/vol %
Amount: 500 μl
Pretreatment: filtering using 0.2 μm filter
Detector: RI-8011

Polyethylene terephthalate (PET) [manuf.: TOYOBO Co., Ltd., trade name: "PETMAX RN203"]

Polycarbonate (PC) [manuf.: Idemitsu Kosan Co., Ltd., trade name: "TARFLON A2500"]

Polyphenylene ether resin (PPE) [manuf.: Mitsubishi Engineering-Plastics Corporation., trade name: "PX100L"]

High impact polystyrene (HIPS) [manuf.: PS JAPAN Corporation, trade name: "HT478"]

Styrene-ethylene/butylene-styrene block copolymer (SEBS) [manuf.: Kraton Polymers JAPAN Ltd., trade name: "KRATON G1652"]

Maleic anhydride-hydrated styrene-ethylene/butylene-styrene block copolymer (MAH-SEBS) [manuf.: Kraton Polymers JAPAN Ltd., trade name: "KRATON FG1901X"]

Ethylene-glycidyl methacrylate-methyl acrylate copolymer (E-GMA-MA) [manuf.: Sumitomo Chemical Co., Ltd., trade name: "BONDFAST 7L"]

Thermoplastic polyester elastomer (hard segment: polyester; soft segment: polyether) (polyester TPE) [manuf.: TOYOBO Co., Ltd., trade name: "PERPRENE P150B"]

Triphenyl phosphate (phosphoric ester <1>)[manuf.: Daihachi Chemical Industry Co., Ltd., trade name: "TPP"]

1,3-phenylene bis(diphenyl phosphate) (phosphoric ester <2>) [manuf.: Daihachi Chemical Industry Co., Ltd., trade name: "CR-733S"]

1,3-phenylene bis(di-2,6-xylenyl phosphate) (phosphoric ester <3>) [manuf.: Daihachi Chemical Industry Co., Ltd., trade name: "PX200"]

1,4-phenylene bis(di-2,6-xylenyl phosphate) (phosphoric ester <4>) [manuf.: Daihachi Chemical Industry Co., Ltd., trade name: "PX201"]

Phenolic antioxidant [manuf.: Adeca Corporation, trade name: "AO-60"]

Sulfurous antioxidant [manuf.: Adeca Corporation, trade name: "A0412S"]

Phosphorus antioxidant [manuf.: Adeca Corporation, trade name: "PEP-36"]

Light stabilizer [manuf.: Adeca Corporation, trade name: "LA51"]

Copper inhibitor [manuf.: Adeca Corporation, trade name: "CDA-1"]

Talc (reinforcing agent <1>) [manuf.: Nippon Talc Co., Ltd., trade name: "SG-95"]

Bentonite (reinforcing agent <2>) [manuf.: Kunimine Industries Co., Ltd.]

Preparation of Wire Covering Material Compositions and Insulated Wires

Firstly, the respective components were kneaded according to constitutions shown in the below-described tables with the use of the twin-screw extruder, and pellets of the wire covering material compositions according to the present Examples and Comparative Examples were prepared.

Subsequently, each of the thus-prepared pellets was dried, and then the surface of the conductor having a size of 0.35 $mm^2$ was covered with one layer of composition through the use of the extrusion molding machine. Thus, the insulated wires according to the present Examples and the Comparative Examples were prepared. In this case, the thicknesses of the covering layers in each insulated wire were all arranged to be 0.2 mm.

Test Method

Each insulated wire prepared as described above was subject to assessments of flame retardancy, tensile elongation and wear resistance.

The assessment of flame retardancy was carried out based on JASO D611. To be more specific, the insulated wires were cut into test specimens 300 mm long. Then, each of the test specimens was placed in an iron test box to be held horizontal, and the tip of a reducing flame by a Bunsen burner having a caliber of 10 mm was placed beneath the center of the test specimen within 30 seconds until it burned, and then, after the flame was calmly removed, afterflame time of the test specimen was measured. The test specimen whose afterflame time was within 15 seconds was regarded as passed, and the one whose afterflame time was over 15 seconds was regarded as failed.

The assessment of tensile-elongation was carried out based on JASO D611. To be more specific, the insulated wires were cut into specimens 150 mm long, from which the conductors were removed, so that tubular test specimens consisting only of the covering layers were made, and then reference lines were marked at intervals of 50 mm along the center line. Next, at room temperatures of 23±5° C., the test specimen was attached by both ends to a chuck of a tensile tester to be pulled at a tensile speed of 200 mm/minute, and a load and a distance between the reference lines at the time when the test specimen was broken were measured. In addition, the tubular test specimens obtained in the same manner as above were left standing for 48 hours in the constant temperature oven at 130° C. for the tubular test specimens to be subjected to thermal aging, and then the same tensile measurement as described above was performed. For tensile elongation, the test specimen whose early-stage elongation and after-aging elongation were both greater than or equal to 125% was regarded as passed, and the test specimen whose early-stage elongation and/or after-aging elongation were smaller than 125% was regarded as failed.

The assessment of wear resistance was carried out by performing the below-described test. To be more specific, the insulated wires were inserted into corrugated tubes, and were subjected to vibrations under conditions of a frequency of 30 Hz, an acceleration of 44.0 m/s$^2$, a temperature of 80° C., and a duration of 240 hours. The insulated wire whose covering material wore out but conductor was not exposed was regarded as passed, and the insulated wire whose covering material wore out and conductor was exposed was regarded as failed.

Constitutions of the wire covering material compositions and assessment results of the insulated wires according to the present Examples and the Comparative Examples are all shown in Tables 1 and 2 below.

TABLE 1

| | Example | | | | | | | |
|---|---|---|---|---|---|---|---|---|
| | 1 | 2 | 3 | 4 | 5 | 6 | 7 | 8 |
| PBT <1> | — | — | 60 | 76 | — | — | 50 | — |
| PBT <2> | — | — | — | — | 55 | 20 | — | 60 |
| PBT <3> | 40 | — | 35 | — | — | — | 10 | 20 |
| PBT <4> | — | 65 | — | 4 | 5 | 20 | — | — |
| PET | — | 5 | — | — | — | — | — | — |
| PC | 40 | 20 | — | 10 | 20 | — | 30 | — |
| PPE | — | — | 4 | — | — | 35 | — | 10 |
| HIPS | — | — | — | — | — | 5 | — | — |
| SEBS | 10 | — | — | — | — | — | — | — |
| MAH-SEBS | 10 | — | 1 | — | 10 | 20 | — | 10 |
| E-GMA-MA | — | 10 | — | 5 | — | — | — | — |
| Thermoplastic polyester elastomer (TPE) | — | — | — | 5 | 10 | — | 10 | — |
| Phosphoric ester <1> | 10 | 10 | — | — | — | — | — | — |
| Phosphoric ester <2> | — | — | — | 8 | 10 | — | — | 10 |
| Phosphoric ester <3> | — | — | 20 | — | — | 1 | — | — |
| Phosphoric ester <4> | — | — | — | d | — | — | 30 | — |
| Phenolic antioxidant | 2 | 1 | 2 | 1 | 2 | 2 | 2 | 2 |
| Sulfurous antioxidant | 1 | 2 | — | 2 | 1 | — | 1 | 1 |
| Phosphorus antioxidant | 1 | — | 1 | — | — | 1 | — | 0.5 |
| Light stabilizer | — | — | — | — | — | 0.5 | — | — |
| Copper inhibitor | 1 | — | — | — | — | 1 | — | 0.5 |
| Reinforcing agent <1> | — | 1 | — | 1 | — | — | — | 1 |
| Reinforcing agent <2> | — | — | 1 | — | — | — | 1 | — |
| Content (wt %) of PBT of Mw/Mn ≧ 2.5 in the total content of PBT | 100 | 100 | 36.7 | 5 | 8.3 | 50 | 16.7 | 25 |
| Assessment Flame retardancy | passed | passed | passed | passed | passed | passed | passed | passed |
| Tensile elongation Early stage elongation | passed | passed | passed | passed | passed | passed | passed | passed |
| 130° C. × 48 hours | passed | passed | passed | passed | passed | passed | passed | passed |
| Wear resistance | passed | passed | passed | passed | passed | passed | passed | passed |

TABLE 2

| | Comparative Example | | | | | | | |
|---|---|---|---|---|---|---|---|---|
| | 1 | 2 | 3 | 4 | 5 | 6 | 7 | 8 |
| PBT <1> | — | 20 | 70 | 50 | — | — | — | — |
| PBT <2> | — | — | — | 30 | 80 | 60 | 50 | 20 |
| PBT <3> | 20 | — | — | — | — | 40 | 20 | — |
| PBT <4> | — | 10 | — | — | — | — | — | 20 |
| PET | — | — | — | — | — | — | — | — |
| PC | — | 20 | 20 | — | 10 | — | — | — |

TABLE 2-continued

|  | Comparative Example | | | | | | | |
|---|---|---|---|---|---|---|---|---|
|  | 1 | 2 | 3 | 4 | 5 | 6 | 7 | 8 |
| PPE | 10 | — | — | 10 | — | — | 10 | 10 |
| HIPS | — | — | — | 5 | — | — | — | — |
| SEBS | 40 | — | — | — | — | — | 10 | 30 |
| MAH-SEBS | 30 | — | — | 5 | — | — | — | 20 |
| E-GMA-MA | — | 20 | 10 | — | — | — | 10 | — |
| Thermoplastic polyester elastomer (TPE) | — | 30 | — | — | 10 | — | — | — |
| Phosphoric ester <1> | — | — | 10 | — | — | 2 | — | — |
| Phosphoric ester <2> | 30 | — | — | 8 | 5 | — | — | — |
| Phosphoric ester <3> | — | 30 | — | — | — | — | — | — |
| Phosphoric ester <4> | — | — | — | — | — | — | — | 40 |
| Phenolic antioxidant | 2 | 2 | 2 | 2 | 2 | 1 | 2 | 1 |
| Sulfurous antioxidant | 1 | 1 | 1 | 1 | 1 | 1 | 1 | 1 |
| Phosphorus antioxidant | — | 1 | — | 0.5 | — | — | — | 0.5 |
| Light stabilizer | — | — | 0.5 | — | — | — | — | — |
| Copper inhibitor | 0.5 | — | — | — | 0.5 | 0.5 | — | — |
| Reinforcing agent <1> | — | — | — | — | — | 1 | 1 | — |
| Reinforcing agent <2> | — | 1 | — | — | — | — | — | — |
| Content (wt %) of PBT of Mw/Mn ≧ 2.5 in the total content of PBT | 100 | 33.3 | 0 | 0 | 0 | 40 | 28.6 | 50 |
| Assessment Flame retardancy | passed | passed | passed | passed | passed | failed | failed | passed |
| Tensile Early stage elongation | passed | passed | passed | passed | passed | passed | passed | passed |
| elongation 130° C. × 48 hours | passed | passed | failed | failed | failed | passed | passed | passed |
| Wear resistance | failed | failed | passed | passed | passed | passed | passed | failed |

According to the above Table 2, it was shown that the insulated wires according to the Comparative Examples gave results of "failed" in any of the assessment items of flame retardancy, tensile elongation and wear resistance.

To be more specific, the insulated wires according to the Comparative Examples 1 and 2 each have the polymer blend in which the amount of the PBT in the polymer blend is out of the specified range according to the present invention (too little), and therefore, the insulated wires according to the Comparative Examples 1 and 2 are insufficient in wear resistance.

The insulated wires according to the Comparative Examples 3 to 5 do not contain at all the PBT whose molecular weight distribution Mw/Mn is greater than or equal to 2.5, and therefore, the insulated wires according to the Comparative Examples 3 to 5 are insufficient in tensile elongation after being subject to the thermal aging.

The insulated wire according to the Comparative Example 6 has the polymer blend in which the amount of the PBT in the polymer blend is out of the specified range according to the present invention (too much), and therefore, the insulated wire according to the Comparative Example 6 is insufficient in flame retardancy.

The insulated wire according to the Comparative Example 7 does not contain at all the phosphoric ester compound, and therefore, the insulated wire according to the Comparative Example 7 is insufficient in flame retardancy.

The insulated wire according to the Comparative Example 8 contains the phosphoric ester compound whose content in the polymer blend is out of the specified range according to the present invention (too much), and therefore, the insulated wire according to the Comparative Example 8 is insufficient in wear resistance.

Table 1 shows that the insulated wires according to the present Examples having the wire covering material compositions according to the present Examples as their covering layers are found superior in all of flame retardancy, tensile elongation and wear resistance.

The invention claimed is:

1. A wire covering material composition comprising:
   100 parts by weight of a polymer blend containing 40-95 wt % of polybutylene terephthalate; and
   1 to 30 parts by weight of a phosphoric ester compound with respect to 100 parts by weight of the polymer blend, wherein
   5 to 100 wt % of the total content of the polybutylene terephthalate in the polymer blend is made up of polybutylene terephthalate, whose molecular weight distribution Mw/Mn (where Mw: weight-average molecular weight; Mn: number-average molecular weight) is greater than or equal to 2.5.

2. An insulated wire having a covering layer composed of the wire covering material composition according to claim 1.

3. The insulated wire according to claim 2, wherein the covering layer is smaller than or equal to 0.4 mm in thickness.

4. A wiring harness comprising the insulated wire according to claim 2.

5. A wiring harness comprising the insulated wire according to claim 3.

* * * * *